United States Patent
Evangelista

[11] Patent Number: 6,148,677
[45] Date of Patent: Nov. 21, 2000

[54] GAS FLOW AREA MEASUREMENT

[75] Inventor: Eduardo R Evangelista, Winnipeg, Canada

[73] Assignee: Standard Aero Limited, Manitoba, Canada

[21] Appl. No.: 09/168,075

[22] Filed: Oct. 8, 1998

[30] Foreign Application Priority Data

Mar. 13, 1998 [GB] United Kingdom .................... 9805422

[51] Int. Cl.$^7$ .............................. G01F 1/86; G01B 13/08; F16L 55/18
[52] U.S. Cl. ........................... 73/861.02; 73/37.5; 137/14
[58] Field of Search ................................. 73/37.5, 861.02; 141/4; 137/14, 599; 123/437, 438

[56] References Cited

U.S. PATENT DOCUMENTS

| | | | |
|---|---|---|---|
| 3,875,955 | 4/1975 | Gallatin et al. ........................... | 137/14 |
| 4,063,449 | 12/1977 | Griggs . | |
| 4,799,511 | 1/1989 | Azimov .................................... | 137/613 |
| 5,238,030 | 8/1993 | Miller et al. . | |
| 5,259,424 | 11/1993 | Miller et al. . | |
| 5,557,050 | 9/1996 | Campain et al. . | |
| 5,653,269 | 8/1997 | Miller et al. ................................. | 141/4 |

FOREIGN PATENT DOCUMENTS

WO 95/32405 11/1995 WIPO .

*Primary Examiner*—Hezron Williams
*Assistant Examiner*—Jay L. Politzer
*Attorney, Agent, or Firm*—Young & Thompson

[57] ABSTRACT

The effective flow area of a restriction in a gas flow passage, such as that of a gas turbine nozzle or vane, is determined by use of a large reservoir containing pressurized gas which is discharged through the passage in a blowdown operation in which the ratio of back pressure of the restriction to gas pressure in the reservoir is maintained below critical for sonic flow; a timer may be used to measure the time for a predetermined fall of pressure in the reservoir whilst there is sonic flow through the restriction.

29 Claims, 1 Drawing Sheet

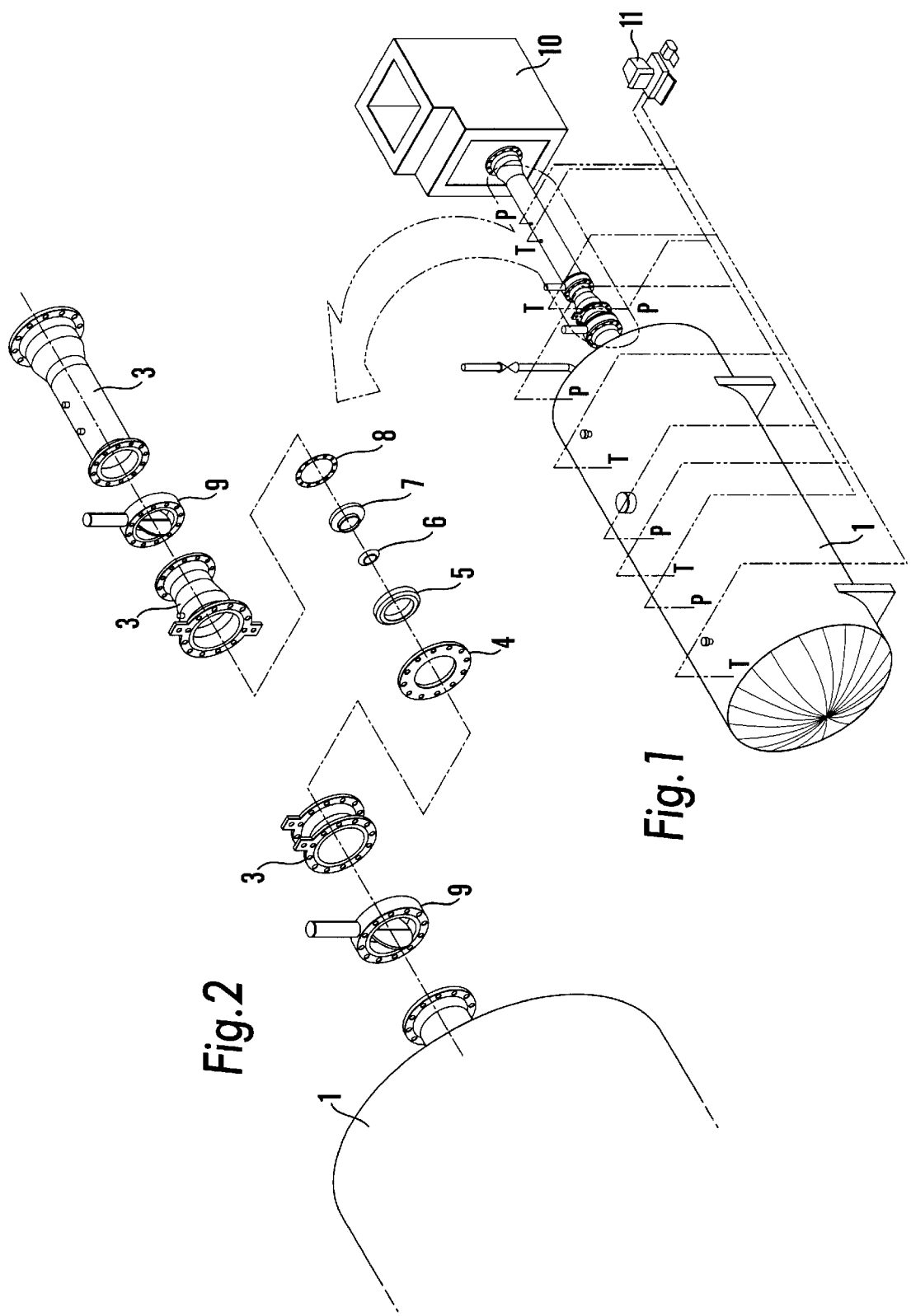

GAS FLOW AREA MEASUREMENT

BACKGROUND OF THE INVENTION

This invention relates to a method of and an apparatus for determining the effective flow area of a restriction in a gas flow passage. It relates in particular, though not exclusively, to a method for measuring the vane (or nozzle) area of a gas turbine engine, and for vane matching of the vane area of a compressor turbine and a power turbine.

The size of a vane (known also as a nozzle) has a significant impact in the performance of gas turbine engines because it changes the operating point on the compressor map. Any change in the turbine vane area rematches the engine to a different gas generator speed, massflow and compressor pressure ratio. For instance, increasing the compressor turbine (CT) vane area while leaving the power turbine (PT) vane area constant has the effect of decreasing the gas generator speed, massflow and compressor pressure ratio at constant output power. Conversely, increasing the PT vane area while leaving the CT vane area unchanged causes the engine to increase in gas generator speed, massflow and compressor pressure ratio at constant output power.

Vane matching based on effective flow area is a crucial engine overhaul procedure for predicting optimum engine performance and achieving optimum efficiency and energy consumption. Improperly matched vanes cause poorer-than-expected engine performance, often resulting in engine failure on test, and increases fuel consumption.

Conventionally, because of the unacceptably high cost and the difficulty of providing a steady sonic rate gas flow, most engine overhaul facilities u se a flow rig that measures the vane area at sub-sonic flows. In actual engine operation, however, the vanes are (or nearly) choked and the gas velocity at the vane's throat is at (or near) the speed of sound. Because of its inability to simulate actual sonic flows the sub-sonic flow rig provides less accurate and less consistent measurement of the vane's area, thus compounding the problem of engine rejects due to incorrect vane match.

SUMMARY OF THE INVENTION

The present invention has as one of its objects the provision of a method and an apparatus in which the inaccuracy and inconsistency associated with conventional techniques for measurement of gas flow through a restriction and for vane matching are mitigated or overcome.

According to one aspect of the present invention a method for determining the effective flow area of a restriction in a gas flow passage comprises providing a gas reservoir, arranging said restriction for communication with a controlled flow of gas flowing from said reservoir through flow control, and then operating the flow control means to allow a transient flow of pressurized gas through the restriction from the reservoir, wherein sonic flow is sustained temporarily at the restriction by maintaining the ratio of the back pressure of the restriction to the gas pressure in the reservoir below critical.

According to another aspect of the present invention apparatus for determining the effective flow area of a restriction in a gas flow passage comprises a reservoir, means for communicating the restriction with the reservoir, flow control means operable to control flow of pressurized gas through the restriction from the reservoir to allow sonic flow to be sustained temporarily at the restriction, pressure sensing means to respond or provide a signal related to the pressure of gas in the reservoir, and timer means operable to provide a signal related to the duration of flow of gas through the restriction.

The method and apparatus may involve timer means operable to measure the time interval for a predetermined fall of pressure in the reservoir during flow of gas through the restriction. Alternatively the timer means may provide a signal which controls is the duration of discharge flow, and the pressures at the commencement and termination of that flow (or the change of pressure) being measured by the pressure sensing means.

The invention accordingly provides within its scope a sonic flow rig which may be operated according to the thermodynamic theory applicable to transient blowing down the compressed gas content of a tank reservoir to atmosphere with a vane, nozzle or like restriction located on the reservoir outlet as a restriction to the gas flow. Sonic flow at the throat of the vane may be generated by keeping the ratio of the back pressure of the vane to the gas pressure in the reservoir below critical throughout the duration of the blowdown process. The vane is considered choked when the gas velocity at the throat reaches the speed of sound.

In contrast to steady state flow conditions, the sonic flow provided by the present invention is transient as massflow diminishes with the decrease in reservoir pressure and temperature during the progression of the blowdown process. Nonetheless the flow is sonic and the cost is comparable to that of a sub-sonic flow rig.

The invention envisages that the transient sonic discharge flow will last for at least 5 (five) seconds, but will be for less than 80 (eighty) seconds. Preferably the sonic discharge flow has a duration between 8 (eight) seconds and 15 (fifteen) seconds. In consequence of the limited time period for discharge flow, the volume of the reservoir for flow through a restriction of a cross-sectional area between 5 and 25 square inches (between 32.3 and 161 square centimeters) does not need to be greater than 1500 cubic feet (42,475,500 cubic centimeters) for a maximum reservoir pressure of 125 psi (862 kPa).

The method and apparatus of the invention may comprise arranging for flow through a restriction positioned between the reservoir and flow control means, or the restriction may be provided downstream of the flow control means.

The invention teaches use of a reservoir having a maximum operating pressure of no more than 400 psi (2758 kPa), preferably m more than 125 psi (862 Kpa).

The invention is particularly applicable to sonic discharge through a restriction which has a cross-section of at least 1 (one) square inch (6.45 square centimeters) and more typically at least 5 (five) square inches (32.3 square centimeters). It is envisaged that the area of the restriction may be in a range which extends to 25 square inches (161 square centimeters), or even up to 100 (one hundred) square inches (645 square centimeters).

It will therefore be appreciated that the invention is applicable to measurement of the area of a gas flow restriction which has an area typical of that found in gas turbine engines.

In at least one of its aspects the invention utilizes the theoretical consideration that the mass flow of gas through a converging nozzle reaches a maximum value when the gas velocity at the throat equals the speed of sound (Mach number is unity or M=I). At this condition, any change in downstream side of the nozzle cannot propagate to the upstream side. Further reduction in the downstream back pressure will not affect the upstream flow rate. The mass flow will remain maximized and the nozzle is said to be choked.

When M=1, the pressure at the throat of the nozzle is called the critical pressure and the critical-to-stagnation pressure ratio is called the critical pressure ratio. For an ideal gas the critical pressure ratio is a constant, dependent on the specific heats of the gas. Sonic flow through a nozzle is generated when the ratio of the back pressure to the upstream stagnation pressure is equal to or less than the critical pressure ratio.

In a tank (reservoir) blowdown system where a nozzle restricts the gas flow, the nozzle is choked when the ratio of the back pressure of the vane to the gas pressure in the tank is less than the critical pressure ratio. Assuming an isentropic expansion of the gas, the governing thermodynamic formula for the effective flow area of the vane is:

$$A = \frac{-2V\left[\left(\frac{pf}{pi}\right)^{(1-y)/2y} - 1\right]}{(1-y)Rt\sqrt{Ti}\sqrt{\frac{y}{R}\left(\frac{2}{y+1}\right)^{(y+1)/(y-1)}}}$$

where:
A is the effective area of the vane (or nozzle or other restriction),
V is the volume of the tank (reservoir),
t is the blowdown time,
pi is the initial absolute pressure of the gas in the tank,
pf is the final absolute pressure of the gas in the tank,
Ti is the initial absolute temperature of the gas in the tank,
R is the specific gas constant,
y is the ratio of the specific heats of the gas.

The vane area may be directly calculated from the above formula by substituting the pressure, temperature and time data taken from the flow run. R and Y are constants specific to the particular gas being used. The volume of the tank should have been previously measured by either the gravimetric or volumetric method.

Alternatively the vane area may be obtained by performing a back-to-back calibration with a master nozzle that has a previously known effective flow area. In this method the master nozzle and the test vane are flowed consecutively in the sonic flow rig at identical tank initial pressure and final pressure. Since R, y, pi, pf and V remain constant between the two runs the effective flow area of test vane can be calculated from the following formula:

$$A = \frac{A_m t_m \sqrt{T_{im}}}{t_i \sqrt{T_{it}}}$$

where:
A is the effective flow area of the test nozzle,
Am is the effective flow area of the master nozzle,
tm is the blowdown time of the master nozzle,
Tim is the initial temperature of the gas in the tank during the master nozzle run,
tt is the blowdown time of the test nozzle,
Tit is the initial temperature of the gas on the tank during the test nozzle run The sonic flow rig apparatus of the invention is suitable for measuring the effective flow area of the vane or like restriction of gas turbine engines at choke conditions. It may consist of a reservoir (tank) that stores a large volume of compressed gas. The vane may be installed on a holding fixture that is mounted in the discharge pipe very close to the reservoir outlet. The discharge pipe may terminate in a silencer. The reservoir and discharge pipe may be instrumented with sensitive pressure transducers and temperature probes. A computer system may be provided to scan the output from the transducers/probes at a very rapid sampling rate.

After charging to pressure the tank may be allowed to blowdown its pressurized gas content by opening a fast acting on-off valve in the discharge line. While collecting pressure and temperature data the computer system may activate a built-in timer when the tank pressure reaches a set initial pressure and deactivates a timer when the tank has blowndown to a set final pressure. Preferably the preset tank initial and final pressures are kept sufficiently high to ensure that the critical pressure ratio is not exceeded throughout the blowdown process, thus guaranteeing sonic flow.

If the volume of the tank is previously known the vane area may be derived using the appropriate thermodynamic formula, given the initial temperature of the gas in the tank, the initial pressure of the gas in the tank, the final pressure of the gas in the tank and the blowdown time. The volume of the tank can be measured using gravimetric or volumetric methods.

If the volume of the tank is unknown the vane area may be obtained by back-to-back flow comparison with a master vane (or nozzle) having a previously known area. When both vanes are flowed at identical initial and final tank pressures the area and blowdown time of the test vane is directly proportional to the area and blowdown time of the master vane. Temperature correction may be applied to offset the small difference in the initial gas temperature between the test vane run and master vane run.

BRIEF DESCRIPTION OF THE DRAWINGS

One embodiment of the present invention is now described by way of example with reference to the drawings in which:

FIG. 1 is a schematic perspective view of apparatus of the invention and,

FIG. 2 shows part of the apparatus of FIG. 1 in an exploded state.

DESCRIPTION OF THE PREFERRED EMBODIMENTS

A holding tank 1 is a certified ASME pressure vessel that serves as the reservoir for the large volume of compressed gas needed for the flow test. The tank is equipped in known manner with an inlet valve, outlet flange, a manhole, a relief valve, a drain valve and various threaded connections for the pressure transducers and temperature probes. The inlet valve is connected by a pipe to a source of clean, dry compressed gas, i. e. a compressed air system or compressed gas tanks.

A main tank shut-off valve 2 is used to isolate the holding tank during the installation of the test component or master nozzle. It eliminates the need to fully depressurize the tank when replacing the test vane or master nozzle, thus preserving the residual compressed gas left in the tank at the end of a test.

Pipe spools 3 act as the discharge pipeline that directs the flow of the large volume of gas into a silencer. They are structurally supported and provided with a retractor that aids in axially moving the discharge pipe in order to gain access to the mounting faceplate 4 of the test vane 7. There are also threaded connections for temperature probes T and pressure transducers P. A vent valve is used for relieving the pressure in the test vane section. The ends of the pipe spools are used as the mounting flange for the shut-off valve 2, faceplate 4 and on-off valve 9.

The faceplate 4 serves as the common mounting surface for the various vane holding fixtures 5.

The vane holding fixture 5 is responsible for securing the test vane (or master nozzle) 7 within the centre of the discharge pipeline. There are several holding fixtures in use. Each holding fixture is designed to match the dimensional configuration of the vane. The holding fixtures are provided with gaskets to prevent gas leakage through the mating surfaces of the holding fixture and test component.

Gasketed blanking plates 6 of appropriate configurations are used to seal of any opening in the test component that is not in the flow path of the gas.

Clamps 8 are used to fasten the test vane 7 to the holding fixture 5.

The fast acting on-off valve 9 controls the blowdown operation of the holding tank 1. It is operated by a pneumatic actuator that facilitates the quick opening and quick closing of the valve.

The silencer 10 suppresses the noise generated by the sonic flow. Being the point of final discharge to atmosphere, the silencer has to be installed in a safe location, preferably outside the building.

The pressure transducers P and temperature probes T measure the pressure and temperature of the gas in the tank 1 and discharge pipe 3. Output signals from the transducers are transmitted to the computer system 11 via shielded cables.

The computer system 11 controls the main operation of the sonic flow rig. It has hardware and software for signal conditioning, rapid data acquisition, data reduction, data storage and data print out. It also sends the output signal that operates the shut-off valve 2 and the on-off valve 9.

In use of the aforedescribed apparatus the sequence of operation starts with the installation of the test vane on the rig. This is accomplished by installing the blanking plates 6 to the test vane 7, securing the vane 7 to the holding fixture 5 using clamps 8, mounting the holding fixture 5 to the faceplate 4, retracting the pipe spool 3 to its close position and securing the flange connection with nuts and bolts.

The tank is then pressurized by opening the tank inlet valve. The computer system 11 monitors the pressure and temperature in the tank and pipe during the charging process. Once the required tank pressure is reached the tank inlet valve is closed and the tank outlet shut-off valve 2 is opened.

The blowdown process starts by opening the on-off valve 9 via a start switch in the computer system 11. The computer system 11 logs temperature and pressure data during the blowdown. It also turns on its built in timer once the preprogrammed initial tank pressure is reached and turns off the timer when the preprogrammed final tank pressure is reached, signifying the end of the blowdown process. The computer system then closes the on-off valve 9.

From the data acquired the computer system 11 calculates the effective flow area of the vane and prints out the test result.

The test vane is removed from the rig by closing the shut-off valve 2, depressurizing the test section by opening the vent valve in the discharge pipe 3, breaking the flange connection at the test section, opening up the discharge pipe 3 to gain access to the test vane 7 and demounting the test vane off the faceplate 4.

The above operation is repeated twice when performing a back-to-back comparison with a master nozzle.

From the foregoing it will be appreciated that the present invention enables the effective flow area, at the sonic flow condition, of a restriction such as that of the nozzle or vane of a gas turbine engine, to be measured accurately and reliably to the degree hitherto thought possible only by use of expensive equipment which provides for a continuous sonic flow. The invention further enables comparisons readily to be undertaken such as for the purpose of vane area matching of the compressor turbine and power turbine stages of a gas turbine engine.

I claim:

1. Method for determining the effective flow area of a restriction in a gas flow passage, said method comprising the steps of:

providing a gas reservoir, providing a flow control means, arranging a restriction in communication with a controlled flow of gas flowing from said reservoir through the flow control means, and operating the flow control means to allow a transient sonic flow of pressurised gas through the restriction from the reservoir, wherein the sonic flow is sustained temporarily at the restriction, as a mass flow rate is allowed to diminish rapidly with rapid decrease in reservoir temperature and pressure, by maintaining the ratio of the back pressure of the restriction to the gas pressure in the reservoir below critical.

2. Method according to claim 1, wherein a timer means is provided to measure the time taken for the pressure in the reservoir to fall from a preset initial pressure to a preset final pressure.

3. Method according to claim 2, wherein said initial and final pressures are selected to ensure that the critical pressure ratio is not exceeded during the flow of gas through the restriction from the reservoir.

4. Method according to claim 1, wherein a timer means is employed to control the period during which gas flows through the restriction.

5. Method according to claim 4, wherein the pressure in the reservoir is measured at commencement and termination of said period of gas flow.

6. Method according to claim 1, wherein the reservoir is of known volume an the effective flow area of said restriction is derived mathematically using measurements taken related to the change in pressure of gas in the reservoir during a measured period of time and a measurement of the temperature of the gas.

7. Method according to claim 1, wherein the effective flow area of said restriction is derived by comparison of the characteristics of flow of gas through said restriction and flow through a comparator restriction of known effective flow area.

8. Method according to claim 7, wherein a restriction under measurement and a comparator restriction are successively the subject of a flow of gas having the same initial and final pressures being measured for each flow and utilized to establish the effective flow area of the restriction the subject of measurement.

9. Method according to claim 1, wherein the transient flow has a duration less than 80 (eighty) seconds.

10. Method according to claim 9, wherein the transient flow has a duration of less than 15 (fifteen) seconds.

11. Method according to claim 1, wherein the initial pressure in the reservoir before discharge flow is less than 400 psi.

12. Method according to claim 11, wherein said pressure is less than 125 psi.

13. Method according to claim 1 as applied to the measurement of a gas flow passage restriction which has an effective flow area which is typical of that found in gas turbine engines.

14. Method according to claim 1, wherein said restriction has a cross-section of between 1 (one) and 100 (one hundred) square inches.

15. Method according to claim 14, wherein the restriction has a cross-section greater than 5 (five) square inches (32.3 square centimeters).

16. Method according to claim 1, wherein use is made of a flow control means arranged downstream of the restriction.

17. Method according to claim 1, wherein use is made of a flow control means arranged upstream of the restriction.

18. Method according to claim 1, and as applied to measuring the vane or nozzle area of a gas turbine engine.

19. Method according to claim 1, and as applied to matching of the vane area of a compressor turbine with that of a power turbine.

20. Apparatus for determining the effective flow area of a restriction in a gas flow passage comprising:
    a reservoir,
    a means for communicating a restriction with the reservoir, a flow control means operable to control a transient sonic flow of pressurized gas through the restriction from the reservoir to allow sonic flow to be sustained temporarily at the restriction
    a pressure sensing means to respond or provide a signal related to the pressure of gas in the reservoir,
    a temperature sensing means for providing a signal related to the temperature of the gas in the reservoir,
    a timer means operable to provide a signal related to the duration of flow of gas through the restriction, and
    a processing means programmed to derive a measurement related to the effective flow area of the restriction by processing signals from the pressure sensing means, the temperature sensing means, and the timer means.

21. Apparatus according to claim 20, wherein the timer means is operable to measure the time interval for a predetermined fall of pressure in the reservoir during flow of gas through the restriction.

22. Apparatus according to claim 20, wherein the timer means is operable to control the period during which gas flows through the restriction.

23. Apparatus according to claim 22, wherein the pressure sensing means is operable to measure pressure in the reservoir at commencement and at termination of the timed transient flow of gas through the restriction.

24. Apparatus according to claim 20, wherein the restriction has a cross-section of at least 1 (one) square inch.

25. Apparatus according to claim 24, wherein the restriction has a cross-section of between 5 (five) square inches and 25 (twenty five) square inches.

26. Apparatus according to claim 20, wherein the gas flow passage restriction has an effective flow area which is typical of that found in gas turbine engines.

27. Apparatus according to claim 20, wherein the reservoir is of known volume.

28. Apparatus according to claim 20, and comprising means for providing a signal related to the temperature of gas in the reservoir.

29. Apparatus according to claim 28, and comprising processing means programmed to derive a measurement related to the effective flow area of said restriction by processing pressure, temperature and time information.

* * * * *